(12) United States Patent
Ramchandran

(10) Patent No.: US 7,194,605 B2
(45) Date of Patent: Mar. 20, 2007

(54) CACHE FOR INSTRUCTION SET ARCHITECTURE USING INDEXES TO ACHIEVE COMPRESSION

(75) Inventor: Amit Ramchandran, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 385 days.

(21) Appl. No.: 10/628,083

(22) Filed: Jul. 24, 2003

(65) Prior Publication Data

US 2004/0093479 A1  May 13, 2004

Related U.S. Application Data

(60) Provisional application No. 60/422,063, filed on Oct. 28, 2002.

(51) Int. Cl.
    G06F 9/312   (2006.01)
(52) U.S. Cl. ................................ 712/220; 712/207
(58) Field of Classification Search ................ 712/220, 712/207
    See application file for complete search history.

(56) References Cited

U.S. PATENT DOCUMENTS

| | | | |
|---|---|---|---|
| 4,713,755 A * | 12/1987 | Worley et al. ............... 711/123 |
| 5,534,796 A | 7/1996 | Edwards | |
| 5,694,613 A | 12/1997 | Suzuki | |
| 5,704,053 A * | 12/1997 | Santhanam ................. 717/158 |
| 5,734,808 A | 3/1998 | Takeda | |
| 5,835,753 A | 11/1998 | Witt | |
| 6,154,494 A | 11/2000 | Araki et al. | |
| 6,601,158 B1 | 7/2003 | Abbott et al. | |
| 6,615,333 B1 | 9/2003 | Hoogerbrugge et al. | |
| 6,684,319 B1 * | 1/2004 | Mohamed et al. ............ 712/24 |
| 6,721,884 B1 * | 4/2004 | De Oliveira Kastrup Pereira et al. ............................. 713/2 |
| 6,819,140 B2 | 11/2004 | Yamanaka et al. | |
| 6,823,448 B2 | 11/2004 | Roth et al. | |
| 6,865,664 B2 * | 3/2005 | Budrovic et al. ........... 712/209 |
| 6,883,074 B2 | 4/2005 | Donohoe | |
| 6,907,598 B2 * | 6/2005 | Fraser ........................ 717/127 |
| 2001/0029515 A1 | 10/2001 | Mirsky | |
| 2004/0133745 A1 | 7/2004 | Ramchandran | |
| 2004/0168044 A1 | 8/2004 | Ramchandran | |
| 2005/0166037 A1 | 7/2005 | Barrick | |

\* cited by examiner

*Primary Examiner*—Eric Coleman
(74) *Attorney, Agent, or Firm*—Patterson & Sheridan, L.L.P.

(57) ABSTRACT

A method for compressing a set of instructions in an adaptive computing machine includes identifying frequently executed instructions, inserting an explicit caching instruction associating the identified instructions with an index value in the set of instructions before the identified instructions and replacing at least one instance of the frequently executed instructions subsequent to the explicit caching instruction with a compressed instruction referencing the index value. One or more instructions can be identified for compression, including groups of consecutive or non-consecutive instructions. The explicit caching instruction directs a node in an adaptive computing machine to store instructions in an instruction storage unit in association with an index value. Instructions stored in the storage unit are retrievable with reference to the index value. The compressed instruction may include one or more references to index values, and can include a sequence of index values indicating the sequence of execution of the associated instructions.

19 Claims, 8 Drawing Sheets

| | | |
|---|---|---|
| 0 | 807 | Control Word 0 |
| 1 | 809 | Control Word 1 |
| 2 | 811 | Control Word 2 |
| 3 | 813 | Control Word 3 |
| 4 | 815 | Control Word 4 |
| 5 | 817 | Control Word 5 |
| 6 | 819 | Control Word 6 |
| 7 | 821 | Control Word 7 |
805
FIG. 8A
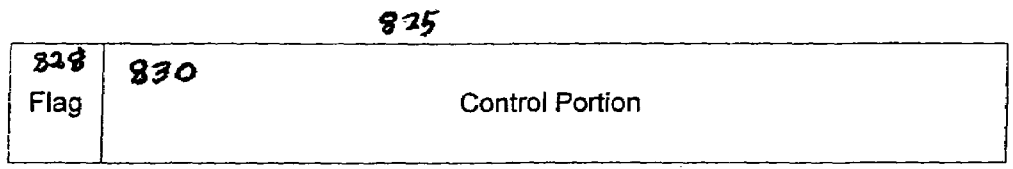
FIG. 8B
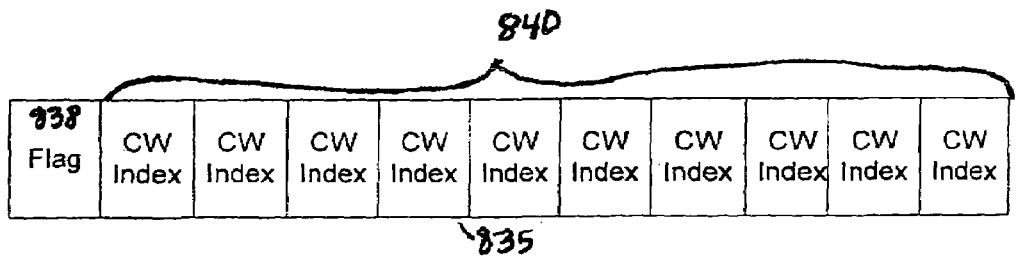
FIG. 8C

CACHE FOR INSTRUCTION SET ARCHITECTURE USING INDEXES TO ACHIEVE COMPRESSION

CLAIM OF PRIORITY

This application claims priority from U.S. Provisional Patent Application Ser. No. 60/422,063, filed Oct. 28, 2002; entitled "RECONFIGURATION NODE RXN" which is hereby incorporated by reference as if set forth in full in this application.

CROSS-REFERENCES TO RELATED APPLICATIONS

This application is related to the following co-pending U.S. Patent Applications that are each incorporated by reference as if set forth in full in this application:

"ADAPTABLE DATAPATH FOR A DIGITAL PROCESSING SYSTEM," Ser. No. 10/623,833, filed Jul. 23, 2003 (Our Ref. No. 021202-003710US);

"INPUT PIPELINE REGISTERS FOR A NODE IN AN ADAPTIVE COMPUTING ENGINE," Ser. No. 10/626,479, filed Jul. 23, 2003 (Our Ref. No. 021202-003720US).

BACKGROUND OF THE INVENTION

This invention is related in general to digital processing architectures and more specifically to the design of a reconfigurable processing node for use in an adaptive computing engine.

The advances made in the design and development of integrated circuits ("ICs") have generally produced information processing devices falling into one of several distinct types or categories having different properties and functions, such as microprocessors and digital signal processors ("DSPs"), application specific integrated circuits ("ASICs"), and field programmable gate arrays ("FPGAs"). Each of these different types or categories of information processing devices have distinct advantages and disadvantages.

Microprocessors and DSPs, for example, typically provide a flexible, software programmable solution for a wide variety of tasks. The flexibility of these devices requires a large amount of instruction decoding and processing, resulting in a comparatively small amount of processing resources devoted to actual algorithmic operations. Consequently, microprocessors and DSPs require significant processing resources, in the form of clock speed or silicon area, and consume significantly more power compared with other types of devices.

ASICs, while having comparative advantages in power consumption and size, use a fixed, "hard-wired" implementation of transistors to implement one or a small group of highly specific tasks. ASICs typically perform these tasks quite effectively; however, ASICs are not readily changeable, essentially requiring new masks and fabrication to realize any modifications to the intended tasks.

FPGAs allow a degree of post-fabrication modification, enabling some design and programming flexibility. FPGAs are comprised of small, repeating arrays of identical logic devices surrounded by several levels of programmable interconnects. Functions are implemented by configuring the interconnects to connect the logic devices in particular sequences and arrangements. Although FPGAs can be reconfigured after fabrication, the reconfiguring process is comparatively slow and is unsuitable for most real-time, immediate applications. Additionally, FPGAs are very expensive and very inefficient for implementation of particular functions. An algorithmic operation implemented on an FPGA may require orders of magnitude more silicon area, processing time, and power than its ASIC counterpart, particularly when the algorithm is a poor fit to the FPGA's array of homogeneous logic devices.

Matrix operations are used in a wide variety of applications. Image and video applications, audio applications, and signal processing applications can all use matrix operations to perform frequency domain transforms, such as discrete cosine and fast Fourier transforms. Image processing applications can use matrix operations to perform down sampling, color conversion, and quantization. Video applications can use matrix operations to perform video compression or decompression, for example MPEG4. Signal processing applications can use matrix applications to implement finite impulse response (FIR) filters. Matrix operations also are used to interpolate data, correlate sets of data, and perform complex-valued mathematical operations.

Most matrix operations must be performed in real-time, so processing speed is an important design consideration. In addition, with some applications, for example mobile communication devices, limited battery capacity makes power consumption a consideration. Cost is also a consideration, thus, the efficient use of silicon area is a priority for many applications.

Thus, it is desirable to provide a node for use in an adaptive computing engine specifically adapted to performing matrix operations.

BRIEF SUMMARY OF THE INVENTION

The present invention includes a method for compressing a set of instructions for an information processing device including identifying at least one frequently executed instruction, inserting an explicit caching instruction associating the identified instruction with at least one index value in the set of instructions before the identified instruction, and replacing at least one instance of the frequently executed instruction subsequent to the explicit caching instruction with a compressed instruction referencing the index value.

In an embodiment, a plurality of instructions are identified for compression. The plurality of instructions can be a group of consecutive instructions, or unrelated, frequently executed instructions. In a further embodiment, the plurality of instructions can be part of an inner loop.

In an embodiment, the explicit caching instruction is configured to direct an information processing device to store one or more identified instructions in an instruction storage unit in association with at least one index value. The instruction or instructions stored in the storage unit can be retrieved with reference to the index value. In a further embodiment, the explicit caching instruction stores each of the plurality of instructions in one of plurality of storage elements in the storage unit. Each storage element is associated with an index value, and the index value can be used to retrieve instruction stored in the associated storage element.

The compressed instruction directs an information processing device to execute the instructions associated with the index value. In an embodiment, the compressed instruction may includes one or more references to the index values. An embodiment of the compressed instruction includes a sequence of index values indicating the sequence of execution of the associated instructions. In a further embodiment, each reference to an index value directs an information processing device to execute the instruction stored in a storage element associated with that index value.

The present invention also includes a method for executing a set of instructions for an information processing device including retrieving a primary instruction within the set of instructions from a memory, storing at least one instruction subsequent to the primary instruction when the primary instruction is an explicit caching instruction, and retrieving and executing at least one previously stored instruction when the primary instruction is a compressed instruction.

In an embodiment, a plurality of instructions are stored in response to an explicit caching instruction. The plurality of instructions can be a group of consecutive instructions, or unrelated, frequently executed instructions.

In a further embodiment, one or more instructions are stored in association with at least one index value in response to an explicit caching instruction. Each instruction associated with an index value can be retrieved and executed with reference to the index value. In an additional embodiment, each of a plurality of instructions are stored in one of a plurality of storage elements.

In an embodiment, the compressed instruction may includes one or more references to the index values. An embodiment of the compressed instruction includes a sequence of index values indicating the sequence of execution of the associated instructions.

The present invention further includes an information processing device including a configuration storage unit adapted to store or retrieve a frequently used configuration, a sequencer adapted to decode a primary instruction from the set of instructions into a configuration, and a functional unit adapted to receive the configuration from the sequencer and process information in accordance with the configuration. The sequencer is adapted to retrieve the configuration from the configuration storage unit when the primary instruction is a compressed instruction. In an embodiment, the sequencer is adapted to retrieve the configuration from the configuration storage unit according to an index value associated with a configuration previously stored in the configuration storage unit. In a further embodiment, the index value indicates a location in the configuration storage unit to the sequencer.

BRIEF DESCRIPTION OF THE DRAWINGS

The present invention will be discussed with reference to the drawings, in which:

FIG. 8A illustrates a control word cache according to an embodiment of the invention;

FIG. 8B illustrates a format of a control word according to an embodiment of the invention; and FIG. 8C illustrates a compressed control word according to an embodiment of the invention.

DETAILED DESCRIPTION OF THE INVENTION

To address the deficiencies of prior types of information processing devices, an adaptive computing engine (ACE) architecture has been developed that provides the programming flexibility of a microprocessor, the speed and efficiency of an ASIC, and the post-fabrication reconfiguration of an FPGA. The details of this architecture are disclosed in the U.S. patent application Ser. No. 09/815,122, entitled "Adaptive Integrated Circuitry with Heterogeneous and Reconfigurable Matrices of Diverse and Adaptive Computational Units having Fixed, Application Specific Computational Elements," filed on Mar. 22, 2001, and incorporated by reference herein.

Figure 1:
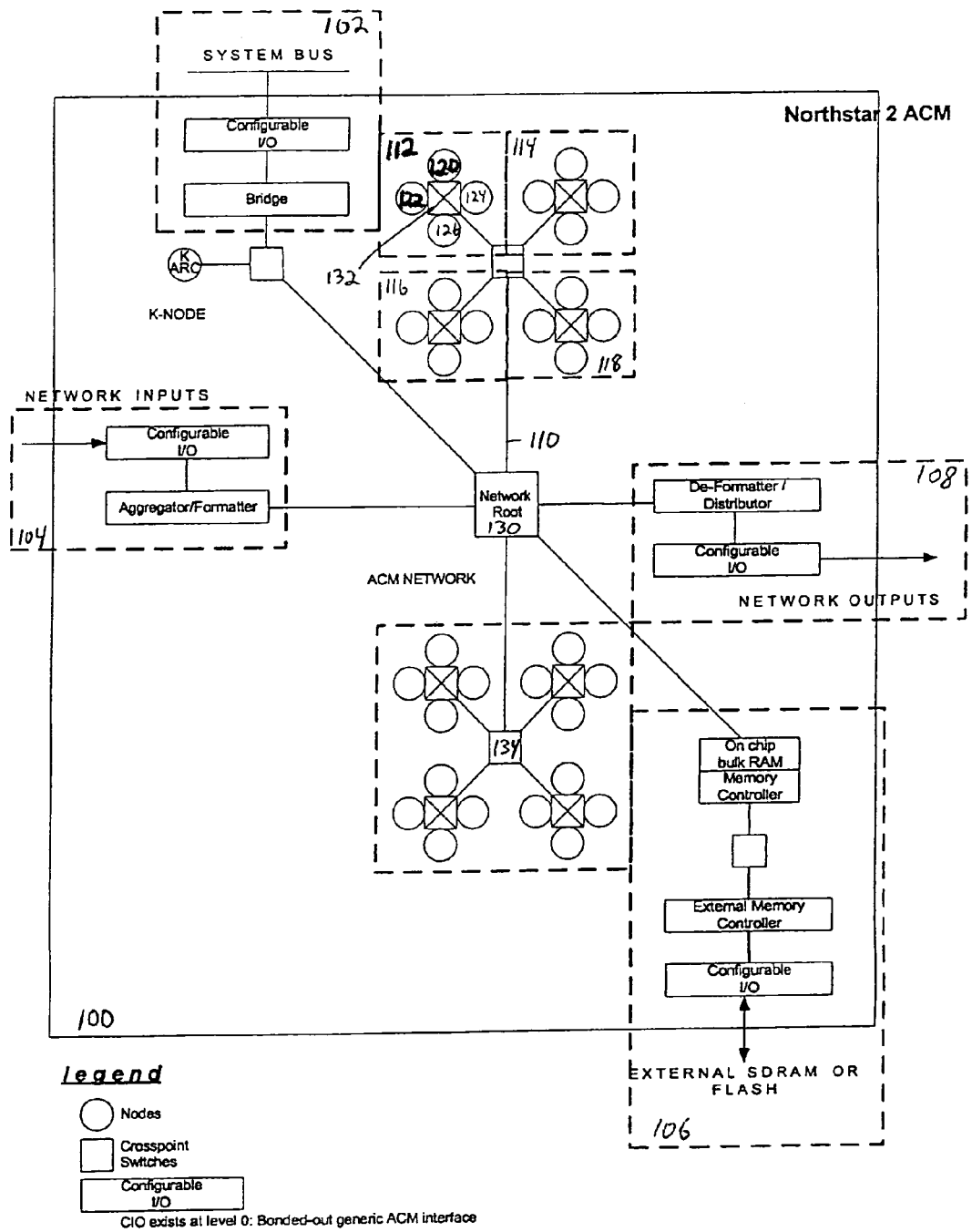
FIG. 1 illustrates an adaptive computing device according to an embodiment of the invention.

In general, the ACE architecture includes a plurality of heterogeneous computational elements coupled together via a programmable interconnection network. FIG. 1 illustrates an embodiment 100 of an ACE device. In this embodiment, the ACE device is realized on a single integrated circuit. A system bus interface 102 is provided for communication with external systems via an external system bus. A network input interface 104 is provided to send and receive real-time data. An external memory interface 106 is provided to enable this use of additional external memory devices, including SDRAM or flash memory devices. A network output interface 108 is provided for optionally communicating with additional ACE devices, as discussed below with respect to FIG. 2.

A plurality of heterogeneous computational elements (or nodes), including computing elements 120, 122, 124, and 126, comprise fixed and differing architectures corresponding to different algorithmic functions. Each node is specifically adapted to implement one of many different categories or types of functions, such as internal memory, logic and bit-level functions, arithmetic functions, control functions, and input and output functions. The quantity of nodes of differing types in an ACE device can vary according to the application requirements.

Because each node has a fixed architecture specifically adapted to its intended function, nodes approach the algorithmic efficiency of ASIC devices. For example, a binary logical node may be especially suited for bit-manipulation operations such as, logical AND, OR, NOR, XOR operations, bit shifting, etc. An arithmetic node may be especially well suited for math operations such as addition, subtraction, multiplication, division, etc. Other types of nodes are possible that can be designed for optimal processing of specific types.

Programmable interconnection network 110 enables communication among a plurality of nodes, and interfaces 102, 104, 106, and 108. By changing the number and order of connections between various nodes, the programmable interconnection network is able to quickly reconfigure the ACE device for a variety of different tasks. For example, merely changing the configuration of the interconnections between nodes allows the same set of heterogeneous nodes to implement vastly different functions, such as linear or non-linear algorithmic operations, finite state machine operations, memory operations, bit-level manipulations, fast Fourier or discrete cosine transformations, and many other high level processing functions for advanced computing, signal processing, and communications applications.

In an embodiment, programmable interconnection network 110 comprises a network root 130 and a plurality of crosspoint switches, including switches 132 and 134. In an embodiment, programmable interconnection network 110 is logically and/or physically arranged as a hierarchical tree to maximize distribution efficiency. In this embodiment, a number of nodes can be clustered together around a single crosspoint switch. The crosspoint switch is further connected with additional crosspoint switches, which facilitate communication between nodes in different clusters. For example, cluster 112, which comprises nodes 120, 122, 124, and 126, is connected with crosspoint switch 132 to enable communication with the nodes of clusters 114, 116, and 118. Crosspoint switch is further connected with additional crosspoint switches, for example crosspoint switch 134 via network root 130, to enable communication between any of the plurality of nodes in ACE device 100.

Figure 2:
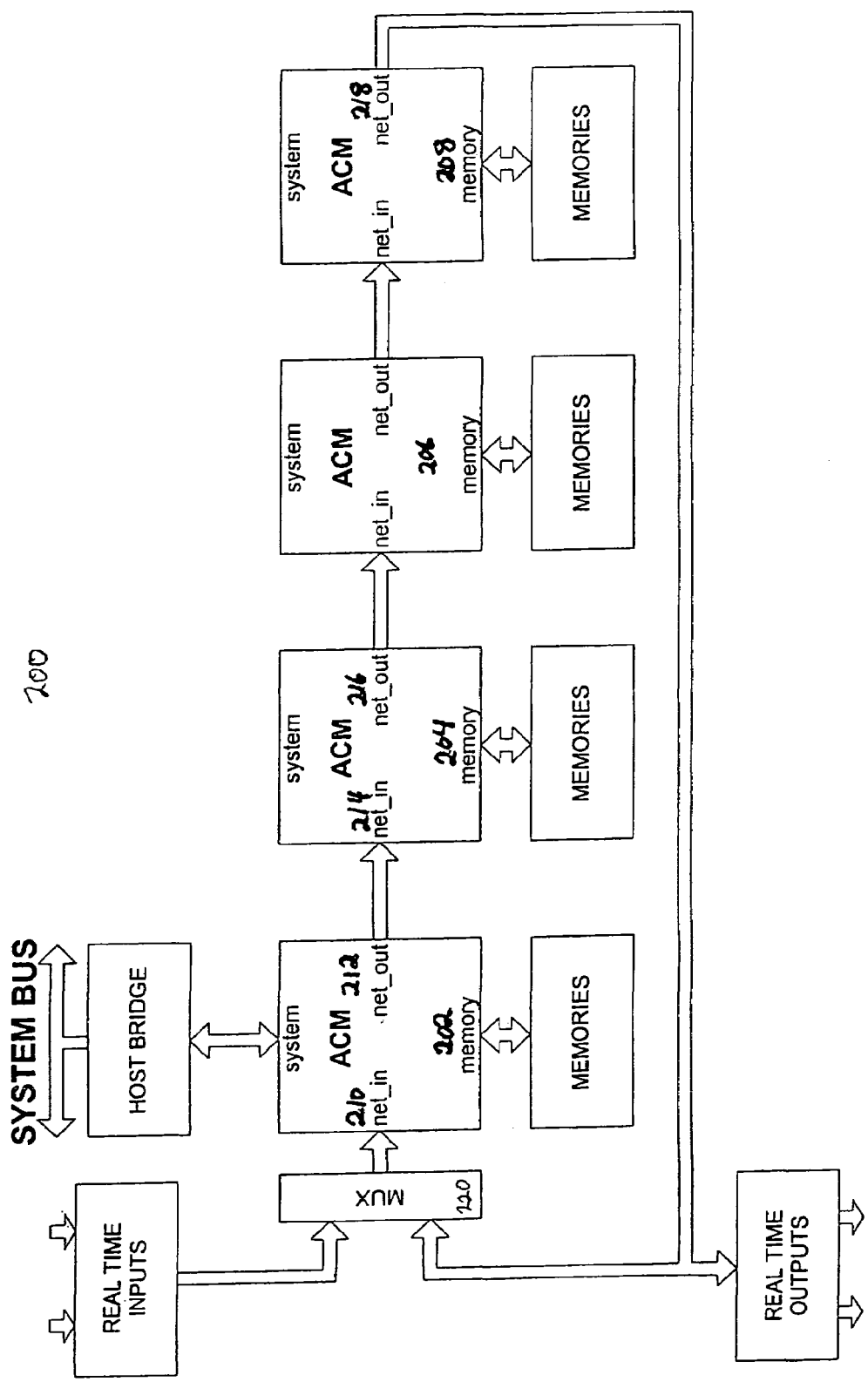
FIG. 2 illustrates a system of adaptive computing devices according to an embodiment of the invention.

The programmable interconnection network 110, in addition to facilitating communications between nodes within ACE device 100, also enables communication with nodes within other ACE devices. FIG. 2 shows a plurality of ACE devices 202, 204, 206, and 208, each having a plurality of nodes, connected together in a development system 200. The system bus interface of ACE device 202 communicates with external systems via an external system bus. Real-time input is communicated to and from ACE device 202 via a network input interface 210. Real-time inputs and additional data generated by ACE device 202 can be further communicated to ACE device 204 via network output interface 212 and network input interface 214. ACE device 204 communicates real-time inputs and additional data generated by either itself or ACE device 202 to ACE device 206 via network output interface 216. In this manner, any number of ACE devices may be coupled together to operate in parallel. Additionally, the network output interface 218 of the last ACE device in the series, ACE device 208, communicates real-time data output and optionally forms a data feedback loop with ACE device 202 via multiplexer 220.

As indicated above, there exists a need for a node in an adaptive computing engine (ACE) adapted to efficiently perform matrix operations for a wide variety of applications that offers fast performance and flexible configuration. In accordance with the present invention, an adaptable execution node (AXN) fulfills these requirements and integrates seamlessly with other types of nodes in the ACE architecture. One aspect of the AXN is a distributed cache architecture that minimizes access to memory and general purpose registers, allows efficient access to matrix elements, and performs matrix transpose operations without the overhead of generating data addresses. Another aspect of the AXN is a control word compression scheme that reduces the power and overhead of instruction decoding, decreases the number of memory and cache accesses, and decreases the memory requirements for an application.

Figure 3:
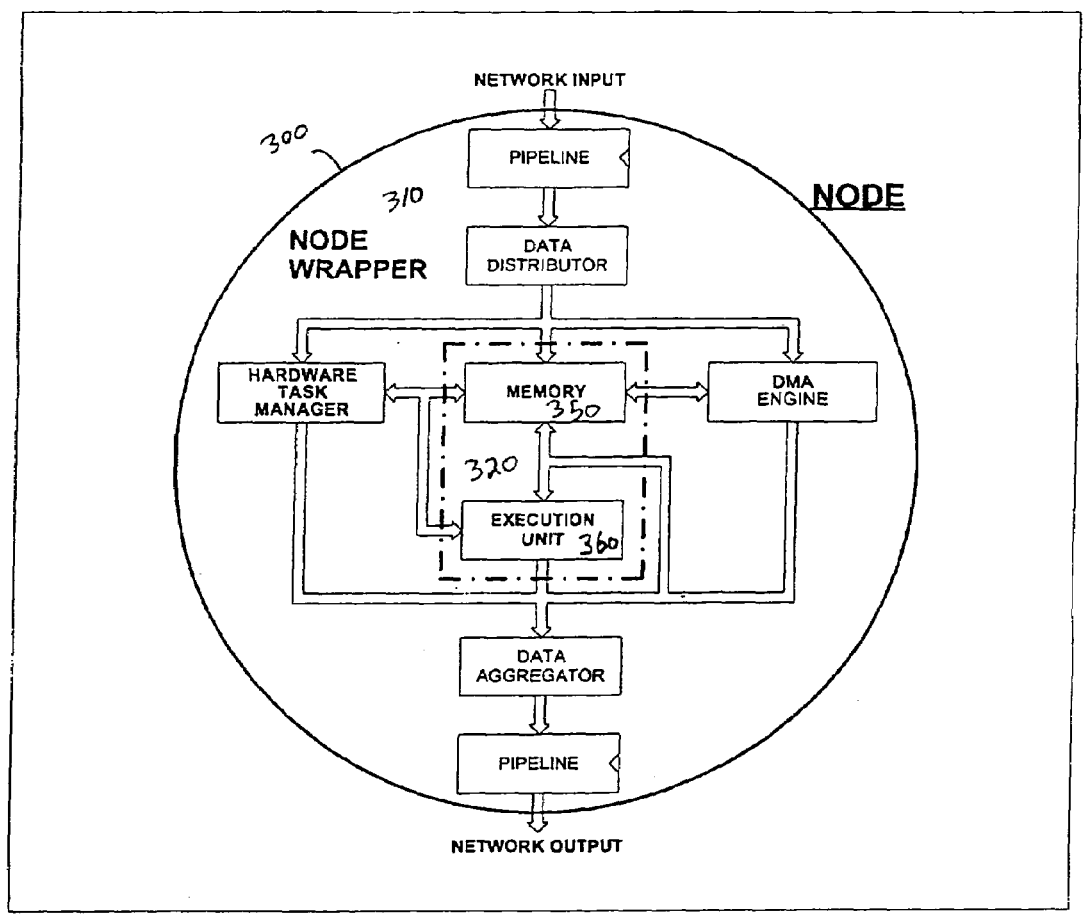
FIG. 3 illustrates a node of an adaptive computing device according to an embodiment of the invention.

FIG. 3 is a block diagram illustrating the general internal structure of a node for use in a ACE. Node 300 can be any type of node, including a node for internal memory, logic and bit-level functions, arithmetic functions, control functions, input and output functions, or an AXN according to the present invention. Node 300 includes a node wrapper 310 to facilitate communications with the programmable interconnection network. Node wrapper 310 receives data and configuration information from the programmable interconnection network and distributes information as appropriate to the node core 320. Node wrapper 310 also collects information from the node core 320 and sends it to other nodes or external devices via programmable interconnection network.

For receiving information, the node wrapper 310 includes a pipeline unit and a data distribution unit. For sending data, the node wrapper 310 includes a data aggregator unit and a pipeline unit. Node wrapper 310 also includes a hardware task manager 340 and a DMA engine 330 that coordinates direct memory access (DMA) operations.

The node core 320 is specific to the intended function of the node. Generally, the node core 320 includes node memory 350 and an execution unit 360. Node memory 350 serves as local storage for node configuration information and data processed by the node. Execution unit 360 processes data to perform the intended function of the node. The size and format of node memory 350 and the internal structure of the execution unit 360 are specific to the intended function of the node. For the AXN of the present invention, the execution unit 360 and the node memory 350 are designed as discussed below to efficiently perform a variety of matrix operations.

Figure 4:
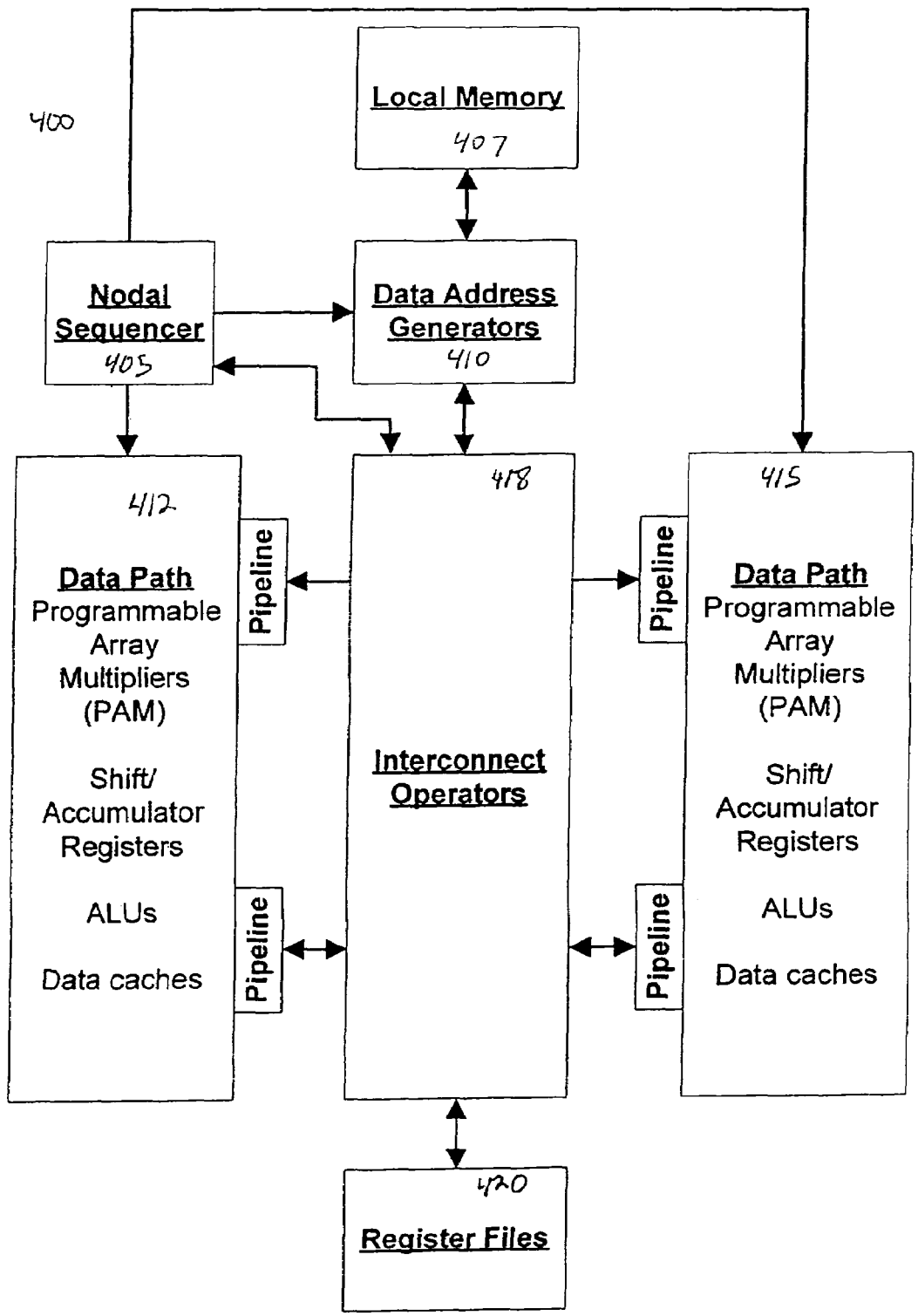
FIG. 4 illustrates the internal structure of a node according to an embodiment of the invention.

FIG. 4 is a block diagram illustrating the general structure of the node core 400 for an AXN node. A nodal sequencer 405 controls the operation of the node core 400, including configuring the various functional units of the node core 400, and implementing flow control operations such as branching, looping, predicted execution, and procedure call. Connected with the nodal sequencer 405 is interconnect operators 418. Interconnect operators 418 allow each functional unit to get its input from the output of any other function unit, or from either registers or memory. The interconnect operators 418 support a high degree of instruction level parallelism and minimize the use of registers and memory to hold temporary values. In an embodiment, the interconnect operators 418 contain eight 16-bit buses.

Data address generators 410 (DAGs) interface local memory 407 with interconnect operators 418. DAGs 410 generate memory addresses corresponding to the memory locations of data to be stored or retrieved in local memory 407. DAGs 410 can be configured by nodal sequencer 405 to generate memory addresses in a sequence. In an embodiment, DAGs 410 include a base register specifying a base memory address, an index register specifying an offset from the base memory address, a delta register specifying an increment to be added to the index register to generate subsequent memory addresses, and a limit register specifying an upper limit to the sequence of memory addresses. In an embodiment, DAGs 410 include four independent data address generators interfaced to four blocks of 1024 by 32 bit byte-addressable memory.

Data Paths 412 and 415 are interfaced with interconnect operators 418. Each data path includes a plurality of programmable array multipliers (PAMs). In one embodiment, each PAM is an 8×8 multiply unit capable of signed or unsigned multiplication. The PAMs of each data path can be configured to operate independently to perform independent 8×8 multiplications, or combined to operate as one or more larger multiplier units. In an embodiment, each data path includes eight PAMs, for a total of sixteen PAMs. These can be combined as one 32×32, 24×24 or 32×24 multiplier, two 32×16, 32×8, 24×16, or 24×8 multipliers, or four 16×16 or 16×8 multipliers.

Each data path further includes a plurality of accumulators configured to accumulate outputs from one or more of the PAMs into a single register. When PAMs are combined to form larger multiplier units, two or more accumulators in the data path can be cascaded to form a single larger register as needed. Each accumulator also includes ZSR functions, which can perform byte level mask operations for data packing, saturate on overflow conditions, and rounding modes, including rounding to +/−infinity, zero, or nearest place. Additionally, each accumulator includes shift register functions, such as left or right shifts, fixed point conversion operations, and counting leading 1's or 0's. The accumulator outputs are interfaced with the interconnect operators 418. In an embodiment, each data path includes four 32-bit accumulators, each with an additional eight sign extension bits.

Each data path also includes a plurality of arithmetic logic units (ALUs) configured to perform arithmetic operations, such as addition, subtraction, averaging, incrementing, decrementing, Boolean logic operations, and other common ALU functions, such as absolute value, pass, minimum, maximum, compare, and clipping. The ALUs are configured to interface with the interconnect operators 418 for their input or output. In an embodiment, each data path includes two 16-bit ALU units with a cascaded carry bit connection, allowing the ALUs to act independently or as a larger ALU. Each data path additionally includes a data cache interfaced with the interconnect operators 418. The structure and operation of the data cache are discussed further below.

Register files 420 are connected with interconnect operators 418. Register files 420 include a plurality of general purpose registers to store intermediate data. In an embodiment, register files 420 include four 16-bit registers interfaced with each of the eight 16-bit buses of the interconnect operators 418.

Figure 5:
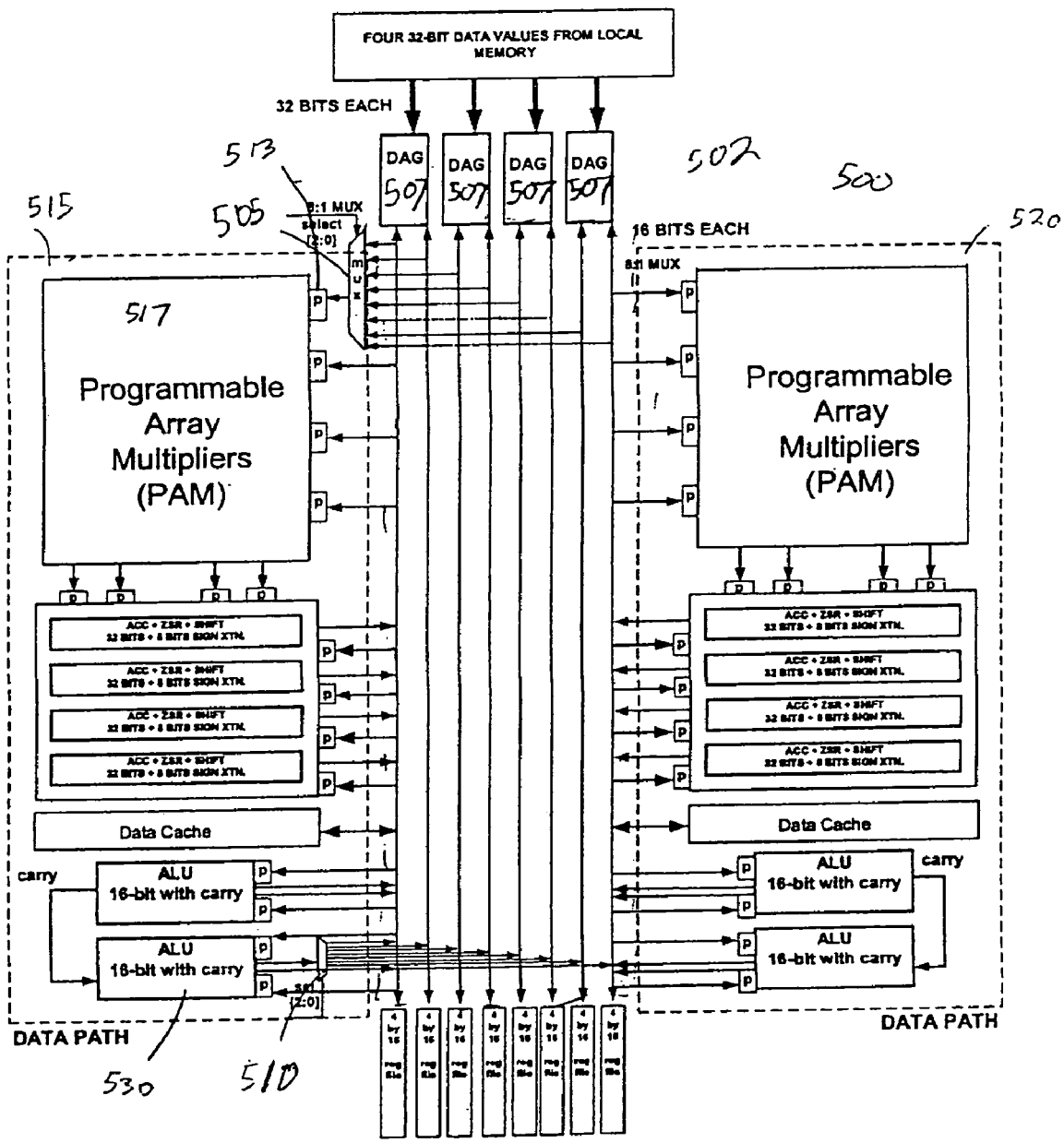
FIG. 5 illustrates a structure of a node core according to an embodiment of the invention.

FIG. 5 is a diagram illustrating the structure of the node core 500 for an AXN node in more detail. In this embodiment, the interconnect operator 502 includes eight 16-bit data buses. Pairs of data buses are connected to each one of the set of four data address generators 502. Multiplexer 505 connects a pipelined input register 513 of the programmable array multipliers 517 of data path 515 with each of the eight data buses of interconnect operator 502. The multiplexed input allows input data from any of the eight data buses to be transferred to the programmable array multipliers 517. Similarly, output multiplexer 510 connects the output of ALU 530 with each of the eight data buses, allowing output data to be transferred to any of the eight data buses. Although omitted from FIG. 5 for clarity, additional input and output multiplexers are used to connect the inputs and outputs of data paths 515 and 520 to each of the eight data buses, such that any input can receive data from any of the data buses and, similarly, any output can transfer data on to any of the data buses.

Figure 6:
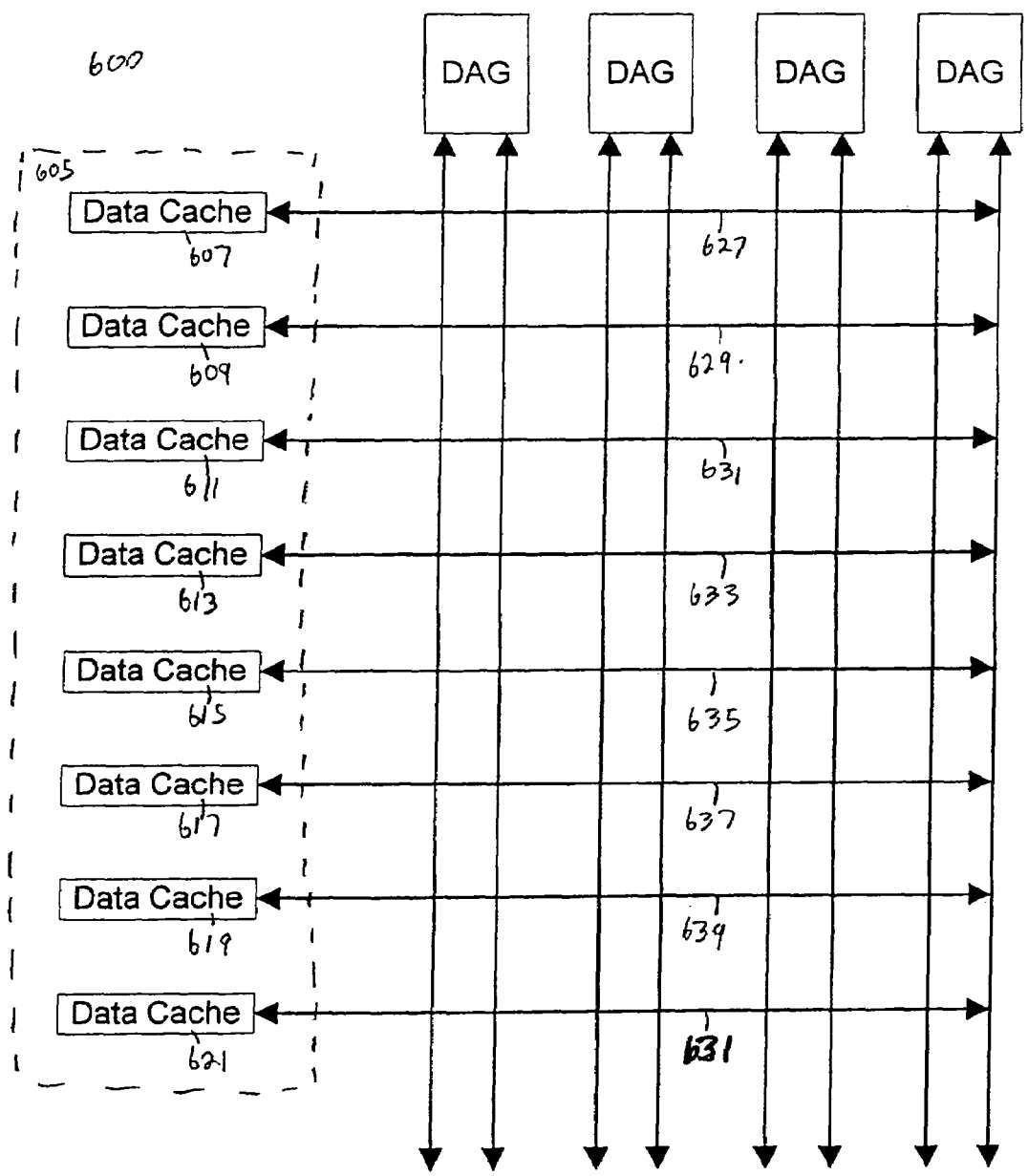
FIG. 6 illustrates a distributed data cache according to an embodiment of the invention.

FIG. 6 is a diagram 600 illustrating a distributed data cache associated with the data paths discussed above. Distributed data cache 605 includes a plurality of separate cache memories 607, 609, 611, 613, 615, 617, 619, and 621. The cache memories are connected with each of the data buses via separate data connections 627, 629, 631, 633, 635, 637, 639, and 641, respectively. The operation of each of these data lines is discussed below. In an embodiment, the number of cache memories is equal to the number of separate data buses. As discussed below, this allows matrix transpose operations to be performed efficiently.

Figure 7:
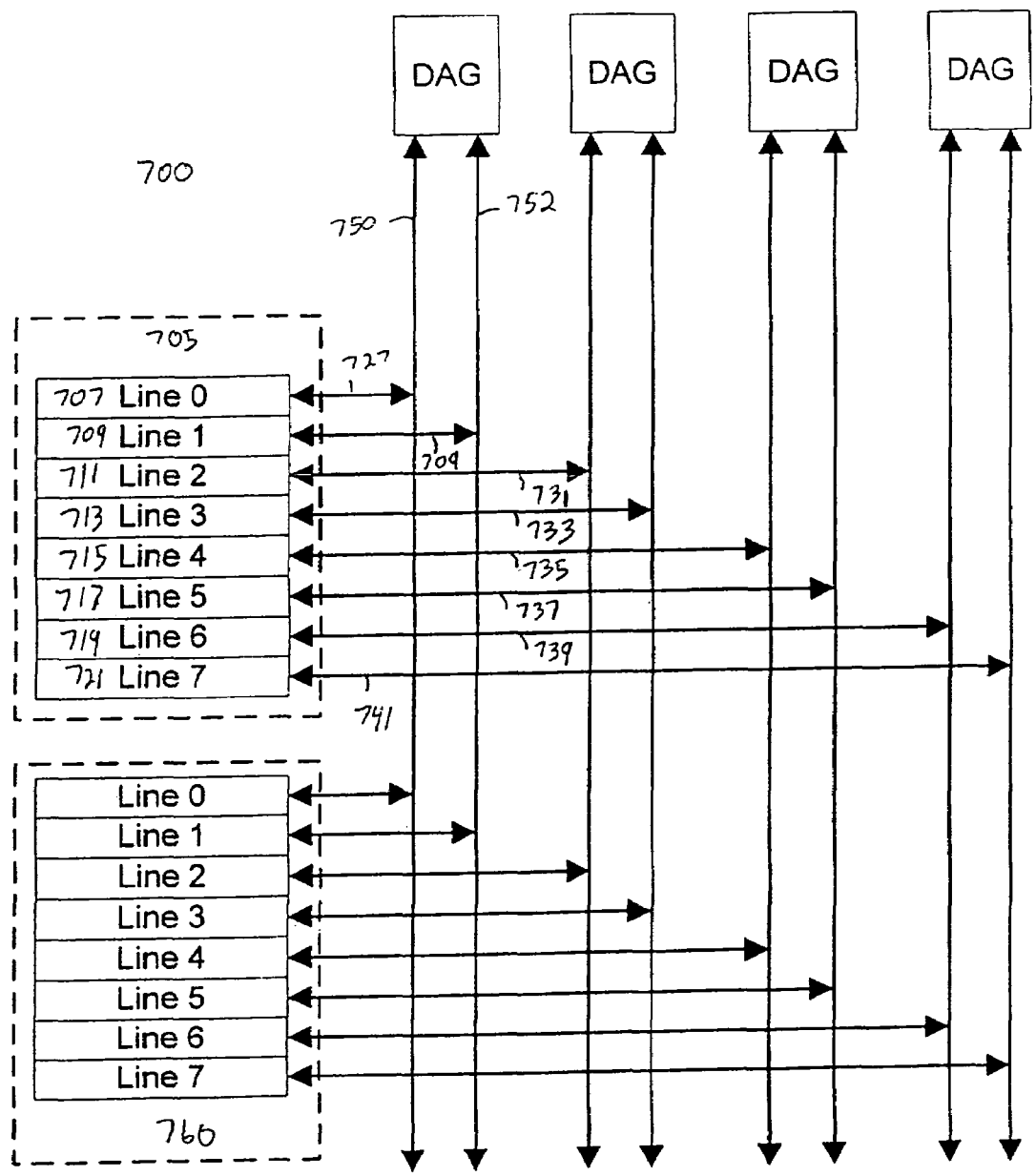
FIG. 7 illustrates the connection between an individual cache memory and the data buses according to an embodiment of the invention.

FIG. 7 is a diagram 700 illustrating the connection between an individual cache memory and the data buses. Cache memory 705 includes a plurality of cache lines 707, 709, 711, 713, 715, 717, 719, and 721. Cache lines are each connected to one of the data buses via data lines 727, 729, 731, 733, 735, 737, 739, and 741. For example, cache line 707 is connected with the data bus 750, and cache line 709 is connected with data bus 752. In an embodiment, each cache line is the same width as the data bus, for example 16 bits, and the number of cache lines in each cache memory is equal to the number of data buses. In this arrangement, each data bus is connected to a different cache line in the cache memories. Additional cache memories, for example cache memory 760, are connected to the data buses in an identical fashion. Thus, in an embodiment with eight data buses and eight cache memories, with each cache memory having eight cache lines, each data bus is connected to one cache line in each cache memory.

The distributed data cache can be accessed with either a single line mode or with a burst mode. In the single line mode, the data is read from or written to a single cache line. In this mode, data is transferred to and from the cache by the data bus connected with the cache line. In burst mode, all of the lines of a cache memory are written to or read from the cache at once. Since each cache line is connected with a different data bus, data can be transferred simultaneously to or from each cache line. Burst mode allows sets of data, for example a group of eight matrix coefficients, to be transferred efficiently to or from the data paths without the need for temporary registers or access to local memory. Additionally, since each data path input and output can be selectively connected with any of the data buses via a multiplexer, as discussed above in FIG. 5, there is never any need for data to be transferred from one data bus to another data bus.

The distributed data cache also enables matrix transpose operations to be performed easily and without additional overhead. 8×8 matrices are commonly used in many applications. For example, the JPEG image compression standard divides an image into blocks of 8×8 pixels. An embodiment of the distributed cache architecture having eight data buses and eight cache memories, each with eight cache lines, can efficiently transpose an 8×8 matrix. To transpose a matrix, a matrix row is read from local memory by the data address generators, and each element of the matrix row is transferred to a different data bus. Then, a burst mode operation is used to simultaneously transfer all of the row elements from their respective data buses into the corresponding cache lines of one of the cache memories. This process is repeated for the remaining rows of the matrix, with each row being stored in a different cache memory. Once this operation is completed, each cache memory contains a column of the transposed matrix.

Alternate embodiment with additional data buses, cache memories, and cache lines can perform the same operation on matrices larger than 8×8.

The advantage of this operation is that the transposed matrix was created using sequential reads from the main memory and burst mode cache writes, and did not require any complicated data address generation, temporary data storage, or data reordering. Not only does the distributed data cache improve the speed of the transpose operation, but since up to 60% of the power consumption is used in accessing memory or general purpose data registers, the distributed data cache consumes much less power than prior designs. Additional power savings are realized because a set of small cache memories consume less power than a single, large cache memory of the same size.

As shown above, the AXN includes numerous selectively configurable elements, such as PAMs, accumulators, and ALU units. These configurable elements can be selectively connected together in a variety of different ways via multiplexers, data bases, data caches, and register files. The configuration of these programmable elements and the connections between them is determined by the value of a control word. A control word includes a number of control bits. In an embodiment, each bit of the control word is associated with the configuration of one of the configurable elements or a connections. In an alternate embodiment, additional bits can be used to control execution flow, such as branching or looping operations. Depending upon the complexity of the configuration, multiple bits may be used to fully configure a configurable element. In an embodiment, each control word is 256 bits.

The AXN executes many control words in sequence to perform the desired processing operations. In an embodiment, the nodal sequencer, shown in FIG. 4, retrieves control words from memory, interprets the control word, and distributes the control bits within each control word to the appropriate configurable elements or connections. Many typical applications repeatedly execute a small number of control words as part of an inner loop. The control word compression scheme in the AXN reduces the power and overhead of control word decoding, decreases the number of memory and cache accesses, and decreases the memory requirements for an application.

FIG. 8A illustrates a control word cache 805 used for control word compression according to an embodiment of the invention. Control word cache 805 includes at least one control word cache line. In an embodiment, control word cache 805 includes eight control word cache lines, 807, 809, 811, 813, 815, 817, 819, and 821. Each control word cache line can store or retrieve a complete set of control bits upon demand. In an embodiment, the control word cache lines are associated with an index value. For example, control word cache line 807 has an index of 0, and control word cache line 813 has an index of 3. Each control word cache can be accessed by its associated index value. In an embodiment with eight control word cache lines, only three bits are needed to select one of the control word cache lines. The depth, or number of cache lines, of the control word cache can be optimized for a specific applications. For example, applications with large inner loops can use an AXN with a larger control word cache.

FIG. 8B illustrates the format of a control word according to an embodiment of the invention. In this embodiment, the control word includes a flag portion 828 and a control portion 830. The flag portion 828 includes at least one bit to indicate to the nodal sequencer the type of control information in the control portion 830. The control portion 830 may include a set of control bits directly associated with configurable elements and connections of the AXN, as discussed above. Alternatively, the control portion 830 may include a set of references to control word cache line indices. The set of references to control word cache line indices specifies a set of instructions to be retrieved from the control word cache. The sequence of the references to control word cache lines indicates the sequence of execution for the control words retrieved from the control word cache.

FIG. 8C illustrates a control word 835 containing a set of references to control word cache line indices 840 according to an embodiment of the invention. Control word 835 has a flag 838 indicating that the remaining control portion 840 of the control word is a set of references to the control word cache line indices. In this embodiment, control word 835 is 256 bits long. The flag 838 is a single bit, and the control portion 840 is the remaining 255 bits. In an embodiment where each control word cache line index is three bits, the 255 bit control portion 840 can specify a sequence of up to 85 control words. Thus, when frequently executed control words are stored in the control word cache, the control word compression scheme saves substantial amounts of application memory. Additionally, because of the relatively small size of the control word cache and the decreased number of local memory accesses when using the control word compression scheme, the power consumption of the AXN is substantially decreased.

Control words can be stored in the control word cache in a number of different ways. In an embodiment, a compiler used to create applications for the AXN identifies sequences of frequently used control words, which typically are located within execution loops. Alternatively, an application programmer can specify specific sequences of source code to be compressed. Once the control words to be compressed are identified, the compiler inserts additional instructions within the compiled application code specifying control words to be loaded into the control word cache. The positions of the inserted instructions within the application code determines when control words are loaded into the control word cache.

In one embodiment, control words can be loaded into the instruction as they are executed for the first time in a sequence. In this embodiment, the compiler inserts a flag into the control word indicating to the nodal sequencer that the control word should be stored in a specific control word cache line. In a further embodiment, a set of control words can be stored in the control word cache using a burst mode instruction. In this embodiment, the compiler inserts a burst mode instruction into the compiled application code. The burst mode instruction is followed by a set of control words to be stored in the control word cache.

In addition to specifying the instructions to be stored in the control word cache, the compiler formats control words to use the cached control words. In an embodiment, the compiler creates control words with a flag value indicating the use of control word cache line indices in the control portion of the control word. The compiler then inserts into the control portion the sequence of control word cache line indices that correspond to the sequence of control words to be executed.

In a further embodiment, the compiler assigns control words to specific control word cache lines so that the same index is used repeatedly. This allows for further compression of the application. For example, the compiler can store a first control word (CW1) in index 0 of the control word cache. Subsequent accesses to this control word can be referenced by the "0" index. A second instruction (CW2) can be stored in the control word cache in index 0, overwriting the first instruction. Subsequent accesses to the second control word can also be referenced by the "0" index. The execution sequence for this application can be seen as "CW1, 0, 0, 0, 0, . . . , CW2, 0, 0, 0, 0, . . . " This sequence of control words can easily be compressed, for example by zero-packing or run-length encoding.

Those skilled in the art will appreciate that the present invention establishes a distributed cache architecture and a control word compression scheme that offers fast performance and flexible configuration. Either of these aspects of the present invention can be adapted to any information processing device. The embodiments described are intended in all respects to be illustrative rather than restrictive. Therefore, it should be understood that the method and apparatus of the present invention could be practiced with modification and alteration within the spirit and scope of the claims herein. Alternative embodiments will become apparent to those skilled in the art to which the present invention pertains without departing from its spirit and scope.

What is claimed is:

1. A method for compressing a set of instructions for a node in a adaptive computing machine, the method comprising:
   identifying frequently executed instruction in the set of instructions for an information processing device;
   inserting an explicit caching instruction in the set of instructions before the identified instruction, wherein the explicit caching instruction associates the identified instruction with at least one index value, the at least one index value referencing an area of an instruction storage unit; and
   replacing at least one instance of the frequently executed instruction subsequent to the explicit caching instruction with a compressed instruction referencing the at least one index value, wherein the compressed instruction directs an information processing device to execute the identified instruction associated with the at least one index value wherein the frequently executed instruction is accessible from the instruction storage unit using the at least one index value.

2. The method of claim 1, wherein the step of identifying includes identifying a subset from the set of instructions comprising a plurality of instructions.

3. The method of claim 2, wherein the subset comprises a plurality of consecutive instructions from the set of instructions.

4. The method of claim 2, wherein the explicit caching instruction directs an information processing device to store the subset of instructions in an instruction storage unit in association with the at least one index value.

5. The method of claim 4, wherein the instruction storage unite has a storage element associated with the at least one index value, such that the subset of instructions stored in the storage element can be retrieved with reference to the at least one index value.

6. The method of claim 4, wherein the instruction storage unit has a plurality of storage elements, each storage element associated with an index value, and the explicit caching instruction directs an information processing device to store each instruction of the subset of instructions in one of the plurality of storage elements, such that each one of the instructions can be retrieved with reference to the index value associated with the storage element.

7. The method of claim 2, wherein the subset of instructions is part of an inner loop.

8. The method of claim 1, wherein the explicit caching instruction directs a node in an adaptive computing machine to store the identified instruction in the instruction storage unit in association with the at least one index value.

9. The method of claim 8, wherein the instruction storage unit has a storage element associated with the at least one index value, such that the instruction stored In the storage element can be retrieved with reference to the at least one index value.

10. The method of claim 6 wherein the compressed instruction includes a plurality of references to the index values, each reference to the index values directing an information processing device to execute the instruction stored in the storage element associated with the referenced index value.

11. The method of claim 10 wherein the plurality of references to the index values are arranged In a sequence indicating the sequence of execution of the associated instructions.

12. A method for executing a set of instructions for an information processing device, the method comprising:
   retrieving a primary instruction within the set of instructions from a memory;
   when the primary instruction is an explicit caching instruction, storing at least one instruction subsequent to the primary Instruction in an instruction storage unit; and
   when the primary instruction is a compressed instruction, retrieving, from the instruction storage unite, the at least one previously stored instruction using the compressed instruction and executing the at least one previously stored instruction.

13. The method of claim 12, wherein the explicit caching instruction stores a subset comprising a plurality of instructions from the set of instructions.

14. The method of claim 13, wherein the explicit caching instruction sores a subset comprising a plurality of consecutive instructions from the set of instructions.

15. The method of claim 13, wherein the explicit caching instruction stores the subset of instructions in association with at least one index value.

16. The method of claim 15, wherein the explicit caching instruction stores each of the subset of instructions in one of a plurality of storage elements, each storage element associated with an index value, such that each one of the instructions can be retrieved with reference to the at least one index value associated with the storage element.

17. The method of claim 12, wherein the explicit caching instruction stores the at least one instruction in association with an index value.

18. The method of claim 17, wherein the compressed instruction includes the index value for retrieving and executing the at least one instruction associated with the index value.

19. An adaptive computing machine configured to compress a set of instructions for a node, wherein the adaptive computing machine comprises one or more processors and a memory containing logic that, when processed by the one or more processors, cause the one or more processors to perform a set of steps comprising:
   identifying frequently executed instruction in the set of instructions for an information processing device;
   inserting an explicit caching instruction in the set of instructions before the identified instruction, wherein the explicit caching instruction associates the identified instruction with at least one index value, the at least on index value referencing an area of an instruction storage unit; and
   replacing at least one instance of the frequently executed instruction subsequent to the explicit caching instruction with a compressed instruction referencing the at least on index value, wherein the frequently executed instruction is accessible from the instruction storage unit using the at least one index value.

* * * * *

UNITED STATES PATENT AND TRADEMARK OFFICE
CERTIFICATE OF CORRECTION

PATENT NO. : 7,194,605 B2  Page 1 of 1
APPLICATION NO. : 10/628083
DATED : March 20, 2007
INVENTOR(S) : Amit Ramchandran It is certified that error appears in the above-identified patent and that said Letters Patent is hereby corrected as shown below:

In column 11, line 53, please replace "In", with --in--

In column 12, line 2, please replace "In", with --in--

In column 12, line 11, please replace "Instruction", with --instruction--

Signed and Sealed this

Nineteenth Day of June, 2007

JON W. DUDAS
*Director of the United States Patent and Trademark Office*